US006437246B1

(12) United States Patent
Dancy

(10) Patent No.: US 6,437,246 B1
(45) Date of Patent: Aug. 20, 2002

(54) TERMINATION COUPLING FOR MINERAL INSULATED CABLE

(75) Inventor: Kevin Charles Dancy, Kingston (CA)

(73) Assignee: Pyrotenax Cables, Ltd., Trenton (CA)

( * ) Notice: Subject to any disclaimer, the term of this patent is extended or adjusted under 35 U.S.C. 154(b) by 0 days.

(21) Appl. No.: 09/739,755

(22) Filed: Dec. 20, 2000

(51) Int. Cl.[7] .................................................. H02G 15/00

(52) U.S. Cl. .......................................................... 174/76

(58) Field of Search ................................ 174/76, 88 R, 174/88 C; 136/233

(56) References Cited

U.S. PATENT DOCUMENTS

| | | | | | |
|---|---|---|---|---|---|
| 3,458,648 | A | * | 7/1969 | Volker | 174/88 C |
| 3,811,958 | A | * | 5/1974 | Maurer | 136/233 |
| 4,590,329 | A | * | 5/1986 | Potochnik et al. | 174/88 R |

* cited by examiner

*Primary Examiner*—Chau N. Nguyen
(74) *Attorney, Agent, or Firm*—Blank Rome Comisky & McCauley LLP

(57) ABSTRACT

A method of terminating or joining mineral insulated cables with metallic outer tubes does not use brazing to fasten outer sleeves over the outer tubes. Instead, the sleeves are crimped onto the tubes. The space within the termination or joint is filled with an epoxy. A conductive strap can be used to maintain ground continuity between the outer tubes.

8 Claims, 2 Drawing Sheets

TERMINATION COUPLING FOR MINERAL INSULATED CABLE

BACKGROUND OF THE INVENTION

1. Field of the Invention

The present invention relates to termination and connection of mineral insulated (MI) heating units and cables.

2. Description of the Related Technology

Mineral insulated cables are used primarily as heating units and power cables. Those cables have an outer sheathing in the form of a metal tube, one to seven conductors, and insulation of magnesium oxide around the conductors which insulates and also holds the conductors in place inside the metal tube.

Sections of mineral insulated cable may be terminated, joined to each other, or joined to non-mineral insulated cables. For example, a mineral-insulated section of non-heating cable may be joined to a section intended for heating; these two sections might be identical except that the heating section has more-resistive internal conductors.

The conventional method of terminating a mineral insulated cable is to slide an open-ended termination fitting over the outer metallic tube of the mineral insulated cable, fill the interior with mineral insulation similar to that in the cable, and then braze a cap onto the open end of the fitting.

The conventional method of making joints between two sections of mineral insulated cable is to join the conductor wires protruding from the ends of each of the metallic tubes, for electrical continuity, and then complete the joint with a slide-on coupling that is brazed onto the metal tubes. The space inside the coupling is hollow and must be filled. That is conventionally accomplished by drilling a small hole in the side of the coupling, injecting additional mineral insulation to fill the void, and then sealing the hole by brazing. The hole is typically tapped to a 6-32 NC thread into which a mating brass screw is turned. The screw is broken off and the end is brazed over.

This process is both time-consuming and uncertain: time-consuming because the fill hole should, for obvious reasons, be small, and filling the entire void within is a lengthy process; uncertain because it is nearly impossible to assure that the void is evenly filled and packed. Gaps are liable to be left, and any effort to pack the mineral insulation into place might shift the conductors, putting strain on wire joints and possibly even causing a short circuit.

In addition, the mineral insulation is usually very hygroscopic and, inevitably, it absorbs water. The filled-in insulation must then be dried prior to sealing the hole, and that requires great care.

Not only the after-filling, but the brazing of the couplings to the tubes, is likewise time-consuming. Thorough cleaning of the tubes and couplings is needed; all oxide must be removed, or else the joint will not be good.

Brazing involves high temperatures that alter the physical properties of the metal in the tubes, making it brittle and leading to increased liability to cracking and a larger permissible bend radius. It also causes new oxidation, which must be removed. In addition, brazing creates unhealthy fumes.

The prior art does not disclose any method of terminating (capping or joining) sections of mineral-insulated cable which is fast, insures uniform filling of voids between internal conductors, does not require cleaning of oxide or corrosion from metal surfaces, and which does not harm cables through high temperature.

SUMMARY OF THE INVENTION

Accordingly, objects of the present invention are to terminate or join sections of mineral insulated cable quickly and reliably; to insure the absence of voids in joined or terminated sections of mineral insulated cable; to eliminate the cleaning of oxide or corrosion from metal surfaces; to keep metal parts below temperatures at which embrittlement occurs; and to avoid unhealthy fumes.

The present invention reduces or eliminates brazing from the processes of joining two sections of mineral insulated cable or of terminating an end of a section of mineral insulated cable. In the present invention, couplings are joined to tubes by crimping, and voids are filled with epoxy. That is faster and more certain than the prior-art methods, does not harm the metal of the tubes, requires a lower level of skill, and eliminates the need for drilling holes in couplings and end fittings.

The present invention may be assembled or made either in a factory or in the field.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE INVENTION

Figure 1:
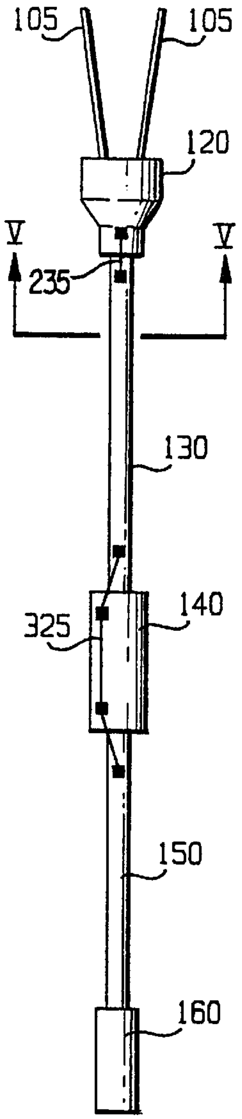
FIG. 1 is a plan view of the invention.
Figure 5:
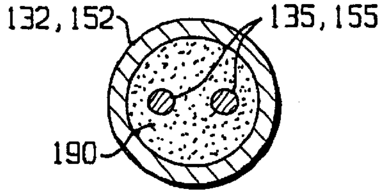
FIG. 5 is a cross-sectional view of section V—V of FIG. 1.

Referring now to the drawings wherein like elements are identified by like reference numerals, there is shown in FIG. 1 a mineral insulated cable 100 of the "D" design type, the type which is exemplary in this application. Two external-power connection wires 105 extend from one end of the mineral insulated cable 100 for connection to a power source. A first coupling 120 couples the wires 105 to a power lead 130 of the cable 100, which is joined by a second coupling 140 to a heating element 150 terminated by a cap 160. The power lead 130 and the heating element 150 are similar in structure, differing mainly in what type of conductive wires 135, 155 are enclosed in them. Their common structure is shown in FIG. 5. It is noted that the invention does not require similarity of structure.

In this disclosure, "termination" includes the structure at the end of a single cable section as well as a joint between two cables.

FIG. 5 is a nominal cross section of the power lead 130, but includes reference numerals for elements of the heating element 150 to simplify the drawing. Each section includes a metallic outer tube 132 (of the power lead) or 152 (of the heating element), a filling of mineral insulation 190, and a pair of inner conductors 135 or 155. The inner conductors may be of low resistance (135, power lead) or of high resistance (155, heating element).

Figure 2:
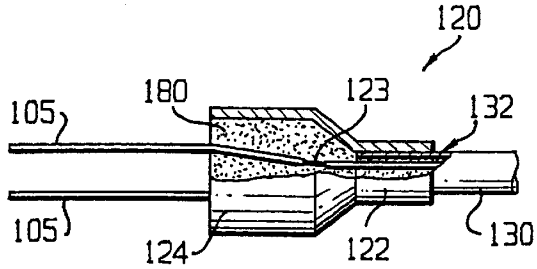
FIG. 2 is a detailed, partially cut-away, view of the invention according to FIG. 1.

FIG. 2 shows in detail the termination or coupling 120 at which the two external power wires 105 are joined to the power lead 130. The wires 105 may be extensions of the two conductors 135 running through the power lead 130, or alternatively there may be a brazed joint 123 between each conductor 135 and its respective external connection wire 105. If the conductors 135 and/or the wires 105 are insulated wires, then an insulating sleeve (e.g., shrink tubing) can be applied to cover the bare joint.

The first termination or coupling 120 is preferably a sleeve of generally constant diameter prior to being crimped onto the outer tube of the cable 130, after which the crimped portion 122 grips the tube 132 of the power lead 130. The un-crimped portion 124, which contains the tube 132 (if any), is of larger diameter.

The preferred material for the sleeve is free-machining brass. One example of a preferred crimping tool is Thomas and Betts model TBM-25S.

There is no need for any additional mineral insulation to be inserted into the un-crimped portion 124. That space is filled with an epoxy 180, that seals the end of the mineral insulated cable 100 without the need for any cap, tamping, or brazing. The epoxy seeps into any gaps between the tube 132 and the crimped portion 122 of the termination 120.

The preferred type of epoxy 180 is potting epoxy which is capable of withstanding high voltages and high temperatures. One example of a preferred epoxy is DURALCO 4525 made by Cotronics of Brooklyn, N.Y.

Figure 3:
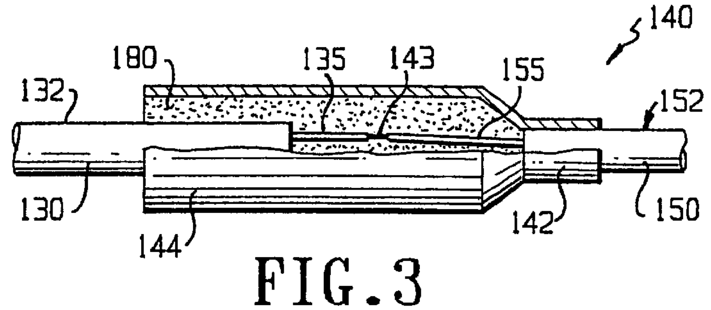
FIG. 3 is a detailed, partially cut-away, view of the invention according to FIG. 1.

FIG. 3 illustrates the coupling 140 between the power lead 130 and the heating element 150. A preferably brazed connection 143 joins the low- and high-resistance conductors 135 and 155. A large-diameter sleeve 144 is crimped at one end to form a reduced-diameter portion 142, which grips the tube 152 of the heating element 150. The gap between the tubes 152 and 132 and the space inside the sleeve 144 is filled with epoxy 180.

Preferably, the cable is assembled in a vertical orientation with the crimped portions 122, 142, and 162 downward. The epoxy 180 fills the upper open end of the sleeve 120, 140, or 160, flows downward to fill the cavity, ani sets. That seals the conductors within and mechanically joins the tubes 132, 152 into a solid unit.

However, in many cases it is preferable to connect the two tubes 132 and 152 electrically and well as mechanically, for example where the tube 152 acts as a ground element. To do that, a connection strap or grounding wire 325, shown in FIG. 1, is used to connect the two tubes and is preferably brazed to the tubes 132, 152, and optionally to the sleeve 140. The wire or strap 325 may be spot-brazed as shown, either before or after filling the sleeve 140 with the epoxy 180.

A similar connecting wire or strap may optionally connect the tube 132 to the sleeve 120 or an adjacent metallic structure (not shown).

Figure 6:
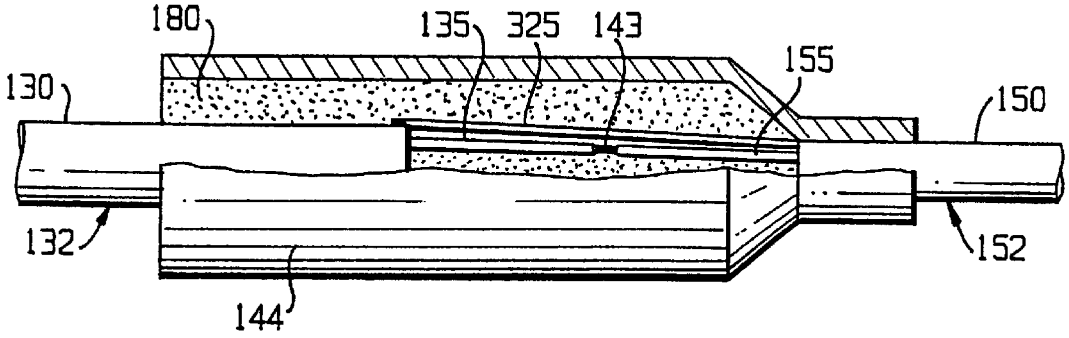
FIG. 6 is a view similar to FIG. 4 but showing an alternative grounding strap.

FIG. 6 shows that the grounding strap 325 may also be internal to the tubes 132, 152. In this embodiment the strap 325 may be brazed in place before filling with epoxy.

Figure 7:
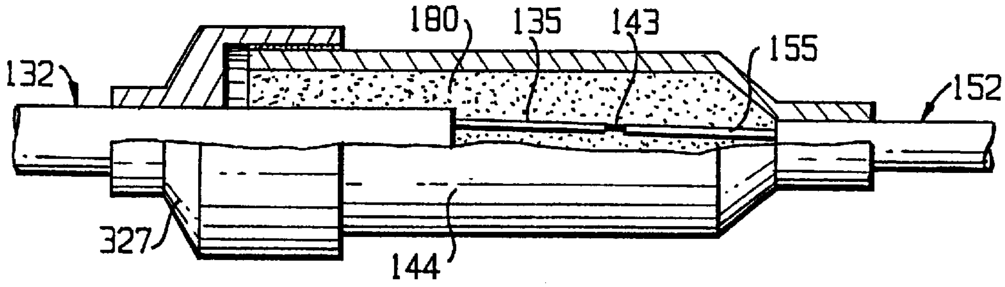
FIG. 7 is a view similar to FIG. 4 but showing an alternative grounding cap.

FIG. 7 shows an embodiment in which the grounding strap 325 is replaced with a grounding cap 327. The grounding cap 327 may be crimped onto the sleeve 144 or attached with threads.

Here, and in the following claims, "connection strap" includes any wire, strip, clamp, spring, lead, cable, mesh, screw-on or clip-on device, or any other conductive element.

Figure 4:
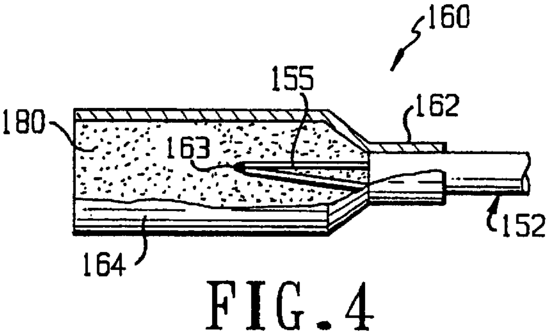
FIG. 4 is a detailed, partially cut-away, view of the invention according to FIG. 1.

FIG. 4 shows the termination 160. The two heating-element wires 155 are (preferably) brazed together at a joint 163, and a sleeve 164 is crimped over the tube 152.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. For first and second mineral insulated cables, each including an outer metallic tube and two internal conductors;

a termination of the outer metallic tubes comprising;

a coupling including at least one crimped portion grasping the first outer metallic tube; and an epoxy filling the interior of the coupling;

a joint between the first mineral insulated cable and the second mineral insulated cable, wherein there is electrical continuity between said internal conductors of the two cables; and a connection strap electrically connecting the first outer metallic tube of the first mineral insulated cable to the second outer metallic tube of the second mineral insulated cable.

2. The termination according to claim 1, wherein the coupling comprises a sleeve including a larger-diameter portion and a smaller-diameter portion at the crimped portion.

3. The termination according to claim 1, said connection strap comprising a grounding cap electrically connecting the first outer metallic tube of the first mineral insulated cable to the coupling adjacent thereto.

4. A method of terminating first and second mineral insulated cables, each including an outer metallic tube and two internal conductors; the method comprising:

crimping a sleeve onto the first outer metallic tube;

filling an interior of the sleeve with epoxy;

forming a joint between the first mineral insulated cable and the second mineral insulated cable;

establishing electrical continuity between said internal conductors of the two cables; and electrically connecting the first outer metallic tube of the first mineral insulated cable to the second outer metallic tube of the second mineral insulated cable.

5. The method according to claim 4, wherein the step of crimping comprises crimping a single end of the sleeve onto the outer metallic tube adjacent an end thereof, and comprising steps of:

vertically aligning the sleeve with an un-crimped end upward;

filling the un-crimped end with the epoxy; and waiting for the epoxy to at least partially harden;

whereby the step of filling the interior of the sleeve with epoxy is aided by gravity.

6. The method according to claim 4, wherein the step of electrically connecting comprises providing a connection strap and electrically connecting the connection strap to the first outer metallic tube of the first mineral insulated cable and to the second outer metallic tube of the second mineral insulated cable.

7. The method according to claim 4, comprising electrically connecting the second outer metallic tube to the sleeve.

8. The method according to claim 7, wherein the step of electrically connecting comprises a providing a connection strap and electrically connecting the connection strap to the second outer metallic tube and to the sleeve.

* * * * *